United States Patent [19]

Takátsy et al.

[11] 4,116,777

[45] Sep. 26, 1978

[54] APPARATUS FOR AND A METHOD OF THE DETERMINATION OF INFLUENZA NEURAMINIDASE

[75] Inventors: Gyula Takátsy; Katalin Barb; István Murányi; Ferencné Burda, all of Budapest, Hungary

[73] Assignee: Labor Muszeripari Muvek, Esztergom, Hungary

[21] Appl. No.: 747,781

[22] Filed: Dec. 6, 1976

[30] Foreign Application Priority Data

Dec. 30, 1975 [HU] Hungary ............................. LA 880

[51] Int. Cl.$^2$ ............................................ G01N 31/14

[52] U.S. Cl. .................................... 195/127; 195/140

[58] Field of Search ....................... 195/127, 139, 140; 23/292

[56] References Cited

U.S. PATENT DOCUMENTS

| | | | |
|---|---|---|---|
| 2,956,931 | 10/1960 | Goldberg | 195/139 |
| 3,785,928 | 1/1974 | Kessler | 195/139 |

*Primary Examiner*—Alvin E. Tanenholtz

[57] ABSTRACT

The reactions for determination of influenza neuraminidase are carried out in a series of bores in a titration plate, heating for the reaction being applied by a heater block with corresponding series of projecting heating elements immersible into the bores, with advantages in ease of mass investigation of different viruses and determination of the state of protection of a population against influenza.

2 Claims, 1 Drawing Figure

APPARATUS FOR AND A METHOD OF THE DETERMINATION OF INFLUENZA NEURAMINIDASE

BACKGROUND OF THE INVENTION

1. Field of the Invention

The invention concerns apparatus and a method for the determination of influenza neuraminidase.

In the fight against influenza one of the most important laboratory tasks is to follow as accurately and as quickly as possible the constant changes of the surface proteins of the influenza virus. Only with the knowledge of these changes is it possible to prepare effective vaccines and to obtain information regarding the state of the protection of the population against influenza.

2. Description of the Prior Art

For the laboratory testing of one of the two surface proteins, i.e. antigens, the so-called haemogglutinin, a micro-method is used. The testing of the other important surface antigen, the so-called neuraminidase enzyme, is cumbersome and involves the use of a complicated test tube system.

The essence of such methods is based on the fact that the enzyme of the surface antigen of the virus is suitable for the release of N-acetyl neuraminic acid (NANA) from mucoprotein and can be determined colorimetrically by means of suitable reagents. From the activity of the enzyme conclusions can be drawn, on the one hand, about the characteristics of the surface antigen of the virus, and on the other hand, by inhibiting the enzymes with specific antibodies, about the affinities or relationships among the viruses and the specificity of the antibodies. The existing test tube method is cumbersome and complicated because the colour reaction takes place only at a specific temperature (90°–95° C) and is stable only at this temperature. Since in such circumstances colorimetric measurement is unsuitable, the colouring material must be extracted with butanol and then centrifuged; but even in this case the measurement or determination must be carried out rapidly because the colour reaction may change in the meantime. The individual handling of the test tubes and the determination of colour intensity by a spectrophotometer is so cumbersome that it is practically impossible to use this method for mass investigation purposes. Nevertheless, there is a distinct need for such mass investigations not only to make comparisons between the different viruses but also, mainly and for the determination of the state of the protection of the population against influenza.

SUMMARY OF THE INVENTION

The aim of the invention is to eliminate as many as possible of the defects described above and to provide a device suitable for carrying out concurrently running mass investigations without difficulty and quickly, with a minimum outlay of materials. The invention is based on the discovery that its aim can be achieved if a reaction based on a micro-method principle is carried out in the cavities of a titration plate specially developed for this purpose. The heating of the reaction mixture is effected by a special heating insert.

The invention accordingly provides device for use in carrying out reactions such as the determination of influenza neuraminidase, comprising a titration plate having series of bores for accommodating reaction mixtures, a heater block with series of heating elements immersible into the bores, and locating elements for ensuring positioning of the heater block relative to the titrating plate.

Expediently, the heating elements have stems or legs of insulating material and heating tips.

The invention also provides a method for determination of influenza neuraminidase, wherein series of reaction mixtures for the determination are placed in corresponding series of bores in a titration plate; a heater block with series of heating elements immersible into the bores is placed on the titration plate with central disposal of the heating elements in the bores ensured by locating elements in block and plate; heating is commenced and continued until reaction is completed; and the determination is made by comparison with standards.

DESCRIPTION OF THE PREFERRED EMBODIMENT

Figure 1:
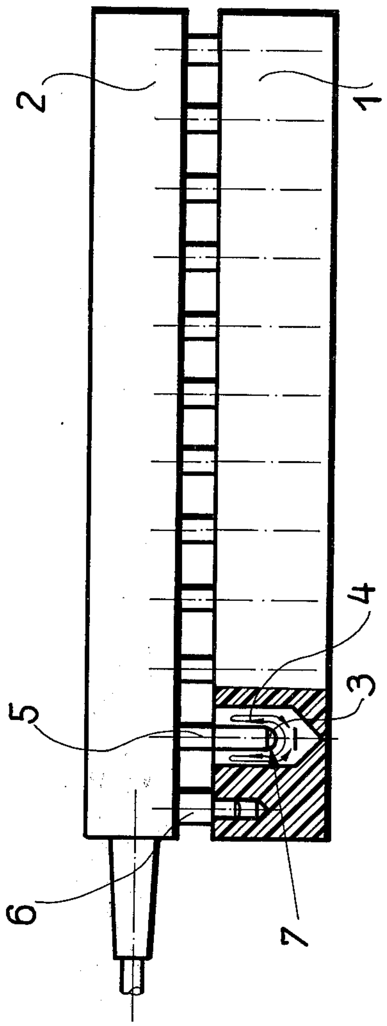

The invention is explained in more detail with reference to the drawing, which shows a preferred embodiment of the apparatus of the invention, in side view and partly broken away.

The device consists of titrating plate 1 and a heater block 2. The titrating plate 1 has bores 4 to accommodate the reaction mixtures. The heater block 2 is fitted with heater elements 7 distributed on the block in correspondence with the distribution of the bores 4 in the titrating plate 1. The stems 5 of the heater elements 7 are made of an insulating material and their pointed ends form heater tips 3. To locate and guide the heater block 2 in relation to the titrating plate 1 positioning elements 6 are provided; in the illustrated embodiment these positioning elements 6 consist of locating pins secured to the heater block 2, and bores in the titrating plate 1.

When using the apparatus according to the invention the reaction is caused to take place in the bores 4 of the titration plate 1. In the case of an enzyme reaction or an enzyme-inhibiting reaction the antibody is diluted by means of diluting devices of a micro-titrator. For the measuring of the diluting solution and the active reagents 25 microliter and 50 microliter calibrated pipettes are used. To heat up the reaction mixture, the heating elements 7 of the heater block 2 are placed into the bores 4 of the titrating plate 1. Due to the fact that the heating is effected by the heater tips 3 of the heating elements 7 only, a convectional flow is generated in the reaction mixture thus creating a mixing effect in addition to the heating. The colour reaction thus develops fast and after lifting the heater block 2 out the colour can be read off immediately and the colour reaction in each of the titration series can be quickly compared with a standard 50% colour reaction representing the titre.

Power for the heating block is obtained from a variable voltage source or via a thermal switch fitted with a temperature sensor. The apparatus according to the invention has all the advantages of a microtitrator but both the outlay of material and dilution time for a series are reduced to about one-tenth. The supply of reagents is quicker and more accurate, so the stability of the colour reaction is increased. Also, the heating time of the reaction mixture is shorter and is more uniform and there is no need for complicated and cumbersome hot water baths. The reading of the reaction is quicker by a whole order of magnitude than for known methods.

The most important advantage of the invention is, however, that in possession of a suitable number of titrating plates a practically unlimited number of investigations can be carried out continuously. The invention is, therefore, suitable for mass investigation and mass screening which hitherto has been impossible.

What we claim is:

1. Device for use in carrying out reaction such as the determination of influenza neuraminidase, comprising a titration plate having series of bores for accommodating reaction mixtures, a heater block with series of heating elements immersible into the bores, and locating elements for ensuring positioning of the heater block relative to the titrating plate.

2. Device according to claim 1 characterized in that the heating elements have stems made of a heat insulating material, and heating tips.

* * * * *